United States Patent
Ashikaga et al.

(10) Patent No.: US 7,522,361 B2
(45) Date of Patent: Apr. 21, 2009

(54) METHOD FOR DETECTING SIGNAL USED WHEN READING INFORMATION FROM STORAGE DEVICE

(75) Inventors: Hiroshi Ashikaga, Kawasaki (JP); Shin Tomimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 181 days.

(21) Appl. No.: 11/449,994

(22) Filed: Jun. 9, 2006

(65) Prior Publication Data

US 2007/0211360 A1  Sep. 13, 2007

(30) Foreign Application Priority Data

Mar. 10, 2006 (JP) .............................. 2006-066673

(51) Int. Cl.
*G11B 5/09* (2006.01)
(52) U.S. Cl. ....................................................... 360/39
(58) Field of Classification Search .................... 360/39, 360/48, 31, 51
See application file for complete search history.

(56) References Cited

U.S. PATENT DOCUMENTS 5,909,331 A * 6/1999 Behrens et al. ................ 360/51
7,248,425 B2 * 7/2007 Byun et al. .................... 360/48
2004/0212912 A1 * 10/2004 Okamoto et al. ............ 360/72.1
2005/0007684 A1 * 1/2005 Watanabe et al. ............. 360/51
2005/0013027 A1 * 1/2005 Ehrlich ........................ 360/29
2006/0002689 A1 * 1/2006 Yang et al. .................. 386/124
2007/0019316 A1 * 1/2007 Norton, Jr. .................. 360/29

FOREIGN PATENT DOCUMENTS

JP  11-025538  1/1999

* cited by examiner

*Primary Examiner*—Fred Tzeng
(74) *Attorney, Agent, or Firm*—Fujitsu Patent Center

(57) ABSTRACT

The storage device 10 provides a signal detection method for preventing the degradation of an error rate at the time of information reading, caused by the change of a magnetic characteristic due to a non-uniform magnetic storage medium. The storage device 10 comprises a storage medium 11 for storing information, a reproduction signal generation unit for generating a reproduction signal, a synch mark pattern detection unit 13 for detecting a synch mark pattern from the reproduction signal, a filter setting unit for setting filters and filters 15 for demodulating the reproduction signal and a data detection unit 16 for detecting data from the demodulated signal.

15 Claims, 12 Drawing Sheets

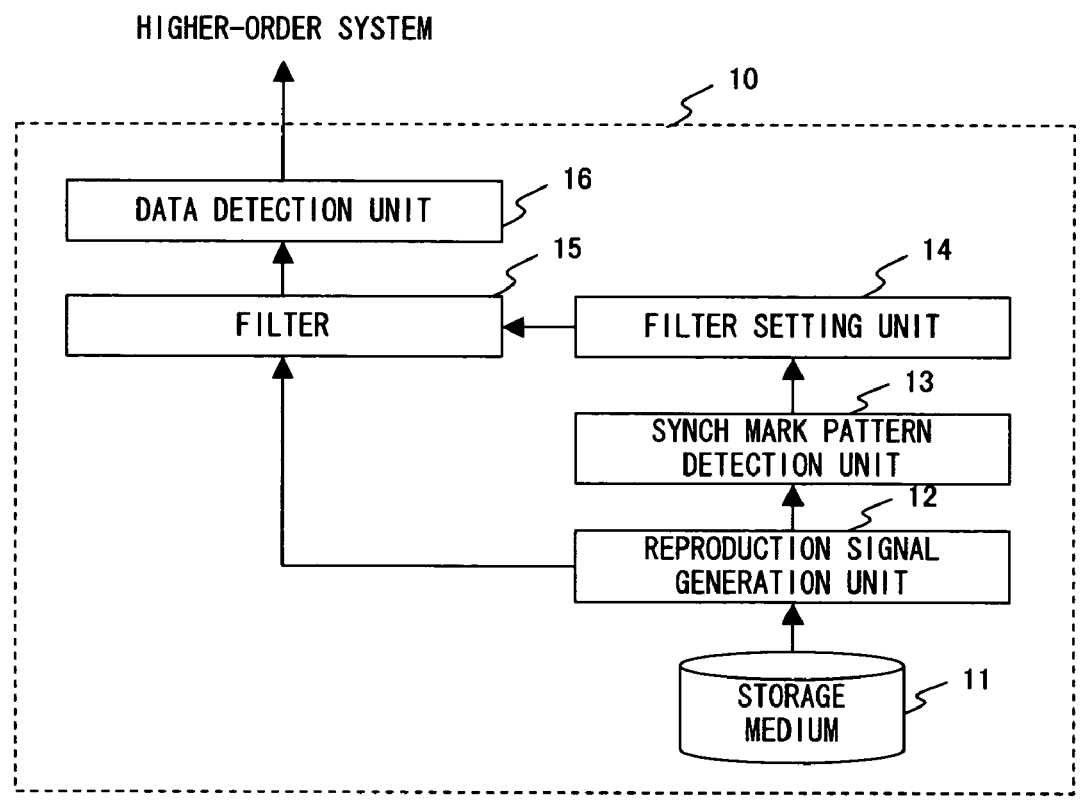
F I G. 1

FIG. 5

| SYNCH MARK | HPF CUT-OFF FREQUENCY | LPF HIGH-BAND CUT-OFF FREQUENCY | LPF Boost VALUE | FIR FILTER TAP CO-EFFICIENT 1 | TAP CO-EFFICIENT 2 | TAP CO-EFFICIENT 3 | TAP CO-EFFICIENT 4 | TAP CO-EFFICIENT 5 |
|---|---|---|---|---|---|---|---|---|
| 1000100011110000 | 1.0MHz | 600MHz | 10dB | 2 | 4 | 10 | -2 | 1 |
| 1000100011110011 | 1.5MHz | 600MHz | 0dB | 1 | 4 | 10 | 6 | 3 |
| 1000100011111111 | 1.0MHz | 500MHz | 10dB | 2 | -1 | 8 | -2 | 1 |
| 1000100011111100 | 1.5MHz | 600MHz | 10dB | 2 | 0 | 9 | -2 | |
| ... | ... | ... | ... | ... | ... | ... | ... | ... |
| 1000100011001111 | 1.0MHz | 550MHz | 0dB | 2 | 3 | 10 | 4 | 4 |

| SYNCH MARK | PR METHOD | LPF CUT-OFF FREQUENCY | LPF HIGH-BAND CUT-OFF FREQUENCY | CTF Boost VALUE | FIR FILTER TAP CO-EFFICIENT 1 | TAP CO-EFFICIENT 2 | TAP CO-EFFICIENT 3 | TAP CO-EFFICIENT 4 | TAP CO-EFFICIENT 5 |
|---|---|---|---|---|---|---|---|---|---|
| 1000100011110000 | EPR4 | 1.0MHz | 600MHz | 10dB | 2 | 4 | 10 | -2 | 1 |
| 1000100011110011 | PR4 | 1.5MHz | 600MHz | 0dB | 1 | 4 | 10 | 6 | 3 |
| 1000100011111111 | EEPR4 | 1.0MHz | 500MHz | 10dB | 2 | -1 | 8 | -2 | 1 |
| 1000100011111100 | EEPR4 | 1.5MHz | 600MHz | 10dB | 2 | 0 | 9 | -2 | |
| ⋮ | ⋮ | ⋮ | ⋮ | ⋮ | ⋮ | ⋮ | ⋮ | ⋮ | ⋮ |
| 1000100011001111 | EPR4 | 1.0MHz | 550MHz | 0dB | 2 | 3 | 10 | 4 | 4 |

| SYNCH MARK | TIMES OF REPETITION | LPF HIGH-BAND CUT-OFF FREQUENCY | LPF Boost VALUE | FIR FILTER TAP CO-EFFICIENT 1 | TAP CO-EFFICIENT 2 | TAP CO-EFFICIENT 3 | TAP CO-EFFICIENT 4 | TAP CO-EFFICIENT 5 |
|---|---|---|---|---|---|---|---|---|
| 1000100011110000 | 1 | 600MHz | 10dB | 2 | 4 | 10 | −2 | 1 |
| 1000100011110011 | 3 | 600MHz | 0dB | 1 | 4 | 10 | 6 | 3 |
| 1000100011111111 | 1 | 500MHz | 10dB | 2 | −1 | 8 | −2 | 1 |
| 1000100011111100 | 1 | 600MHz | 10dB | 2 | 0 | 9 | −2 | 1 |
| ⋮ | ⋮ | ⋮ | ⋮ | ⋮ | ⋮ | ⋮ | ⋮ | ⋮ |
| 1000100011001111 | 5 | 550MHz | 0dB | 2 | 3 | 10 | 4 | 4 |

100

| SERVO SYLINDER | SERVO FRAME | SERVO SYNCH MARK |
|---|---|---|
| — | — | 100010001111 |
| 4000 | 30 | 100010001100 |
| 6000 | 15 | 100010111111 |
| 9203 | 15 | 100010001111 |
| 24000 | 50 | 100011111111 |
| ... | ... | ... |
| 89000 | 40 | 100010000011 |

| SERVO SYNCH MARK | HPF CUT-OFF FREQUENCY | LPF HIGH-BAND CUT-OFF FREQUENCY | LPF Boost VALUE | FIR FILTER TAP CO-EFFICIENT 1 | TAP CO-EFFICIENT 2 | TAP CO-EFFICIENT 3 | TAP CO-EFFICIENT 4 | TAP CO-EFFICIENT 5 |
|---|---|---|---|---|---|---|---|---|
| 100010001111 | 1.0MHz | 130MHz | 10dB | 2 | 4 | 10 | -2 | 1 |
| 100010001100 | 1.5MHz | 130MHz | 0dB | 1 | 4 | 10 | 6 | 3 |
| 100010111111 | 1.0MHz | 160MHz | 10dB | 2 | -1 | 8 | -2 | 1 |
| 100011111111 | 1.5MHz | 140MHz | 10dB | 2 | 0 | 9 | -2 | |
| ⋮ | ⋮ | ⋮ | ⋮ | ⋮ | ⋮ | ⋮ | ⋮ | ⋮ |
| 100010000011 | 1.0MHz | 150MHz | 0dB | 2 | 3 | 10 | 4 | 4 |

120

F I G. 1 2

METHOD FOR DETECTING SIGNAL USED WHEN READING INFORMATION FROM STORAGE DEVICE

BACKGROUND OF THE INVENTION

1. Field of the Invention

The present invention relates to a method for detecting a signal used when reading information from a storage device, such as a magnetic disk storage device or the like.

2. Description of the Related Art

A storage device, such as a magnetic disk device or the like, divides a magnetic medium into sectors and stores data.

Although on the surface of this magnetic medium, a magnetic film is uniformly formed, strictly speaking, there are parts whose magnetic characteristics subtly change or are lost. Therefore, in a part whose magnetic characteristic is different from the circumference, the characteristic of a reproduction signal changes and the error rate of information read from the magnetic disk device degrades.

Japanese Patent Application Publication No. H11-025538 discloses a magneto-optical disk recording power control method for optimally controlling the recording power of a magneto-optical disk according to the difference of the mark width in its track width direction.

SUMMARY OF THE INVENTION

It is an object of the present invention to provide a signal detection method for preventing the degradation of an error rate, caused by the change of a magnetic characteristic, due to a non-uniform magnetic storage medium when reading information, in order to solve the problem.

The storage device of the present invention demodulates a signal reproduced from a storage medium and reads its data to solve the problem. The storage device comprises a reproduction signal generation unit for generating a reproduction signal from information stored in the storage medium, a synch mark pattern detection unit for detecting a synch mark pattern indicating the starting point of the data in the reproduction signal, a filter setting unit for modifying the setting of a filter which is used to demodulate the reproduction signal and whose demodulation method can be modified, according to the synch mark pattern and a data detection unit for detecting data which is demodulated via the filter and which follows the synch mark pattern.

According to the present invention, the filter setting is modified according to the detected synch mark pattern by the synch mark pattern detection unit and data is detected from the demodulated signal via this set filter. Therefore, for example, in an area where its error rate degrades, by using the synch mark pattern in accordance with the filter setting which satisfies a certain level of error rate, the degradation of the error rate of the magnetic storage medium at the time of information reading, due to the change of the magnetic characteristic by its non-uniformity can be prevented.

As described above, the present invention can provide a signal detection method for preventing the degradation of the error rate of the magnetic storage medium at the time of information reading, due to the change of the magnetic characteristic by its non-uniformity.

BRIEF DESCRIPTION OF THE DRAWINGS

FIG. 1 shows the outline of the storage device in the preferred embodiment of the present invention;

FIG. 5 shows an example of the filter setting table of the first preferred embodiment;

FIG. 9 shows an example of the PR method setting table of the second preferred embodiment;

FIG. 10 shows an example of the repetition times setting table of the third preferred embodiment;

FIG. 11 shows an example of the synch mark allocation table in the servo area of the first preferred embodiment; and FIG. 12 shows an example of the filter setting table in the servo area of the first preferred embodiment.

DESCRIPTION OF THE PREFERRED EMBODIMENTS

Figure 2:
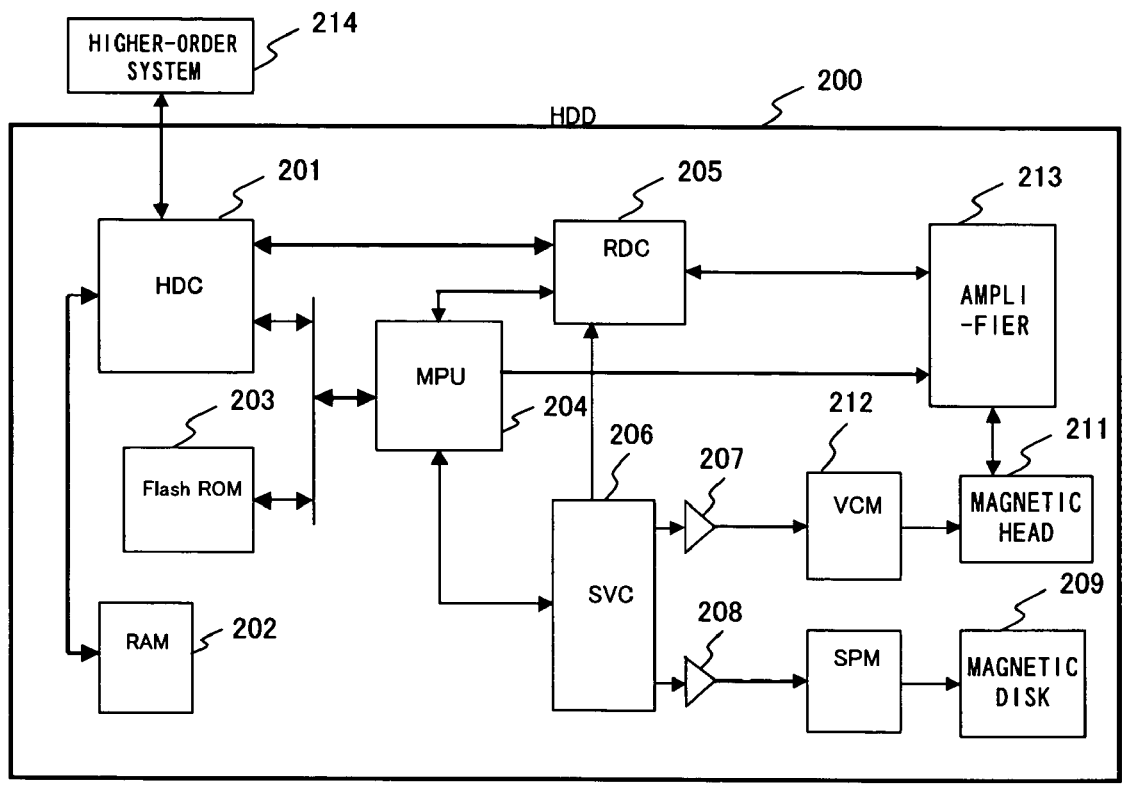
FIG. 2 shows an example of the configuration of the storage device in the preferred embodiment of the present invention.

The preferred embodiments of the present invention are described below with reference to FIGS. 1 through 12.

FIG. 1 shows the outline of the storage device 10 in the preferred embodiment of the present invention.

The storage device 10 shown in FIG. 1 comprises a storage medium 11 for storing information, a reproduction signal generation unit 12 for generating a signal (hereinafter called a "reproduction signal") from information stored in the storage medium 11, a synch mark pattern detection unit 13 for detecting a synch mark pattern from the reproduction signal, a filter setting unit 14 for setting a filter 15 (hereinafter this setting is called "filter setting") according to the synch mark pattern, a filter 15 for demodulating the reproduction signal and a data detection unit 16 for detecting data from the demodulated signal.

For the storage medium 11, a magnetic disk or the like is used. The filter is comprised of one or two and more filters. By the filter setting unit 15 setting the cut-off frequency or the like, of each filter, the reproduction signal demodulation method can be modified.

Data detected by the data detection unit 16 is transmitted to a higher-order system.

FIG. 2 shows an example of the configuration of the storage device 10 in the preferred embodiment of the present invention. In the preferred embodiment of the present invention described below, as the storage device 10, a magnetic disk device 200 is used.

The magnetic disk device 200 shown in FIG. 2 comprises a hard disk controller (HDC) 201 for controlling the entire magnetic disk device 200, random-access memory (RAM) 202 for storing data and the like, needed to operate the HDC 201, flash read-only memory (ROM) 203 for storing a program and the like for operating the HDC 201 and a microprocessor unit (MPU) 204, a MPU 204 for controlling a read channel (RDC) 205, a servo controller (SVC) 206 and the like, an RDC 205 for reproducing a signal read from a magnetic disk 209 and so on, an SVC 206 for controlling a spindle motor (SPM) 210 and a voice coil motor (VCM) 212, drivers 207 and 208 for driving the SPM 210 and VCM 212, a magnetic disk 209 for storing information, an SPM 210 for rotating the magnetic disk 209, a magnetic head 211 for reading/writing data from/into the magnetic disk 209, a VCM 212 for moving the position of the magnetic head 211 and an amplifier 213 for amplifying a signal from the magnetic head 211.

Data transmitted from the higher-order system 214 is received by the HDC 201. Then, the HDC 201 temporarily stores the data in the flash ROM 203 according to an instruction from the MPU 204 and then supplies the data to the RDC 205. The data transmitted to the RDC 205 is transmitted to amplifier 213 and is stored in the magnetic disk 209 via the magnetic head 211.

The signal reproduced from the magnetic disk 209 by the magnetic head 211 is supplied to the amplifier 213. The amplifier 213 appropriately amplifies the reproduction signal and supplies the signal to the RDC 205. The RDC 205 demodulates the reproduction signal supplied from the amplifier 213 to digital data and supplies the data to the HDC 201. Then, the data is temporarily stored in the flash ROM 203 according to an instruction from the MPU 204. Alternatively, the RDC 205 transmits the data to the higher-order system 214.

The servo information recorded in the magnetic disk 209 is also read from the magnetic disk 209 via the magnetic head 211 and supplied to the amplifier 213. The amplifier 213 appropriately amplifies the reproduction signal and supplies the signal to the RDC 205. The RDC 205 demodulates servo location information from the reproduction signal supplied from the amplifier 213.

The MPU 204 is operated by executing the program stored in the ROM 203. For example, the MPU 204 controls the VCM 212 via the SVC 206 by supplying the servo location information to the SVC 206. Then, the MPU 204 makes the magnetic head 211 seek to a desired position.

Figure 3:
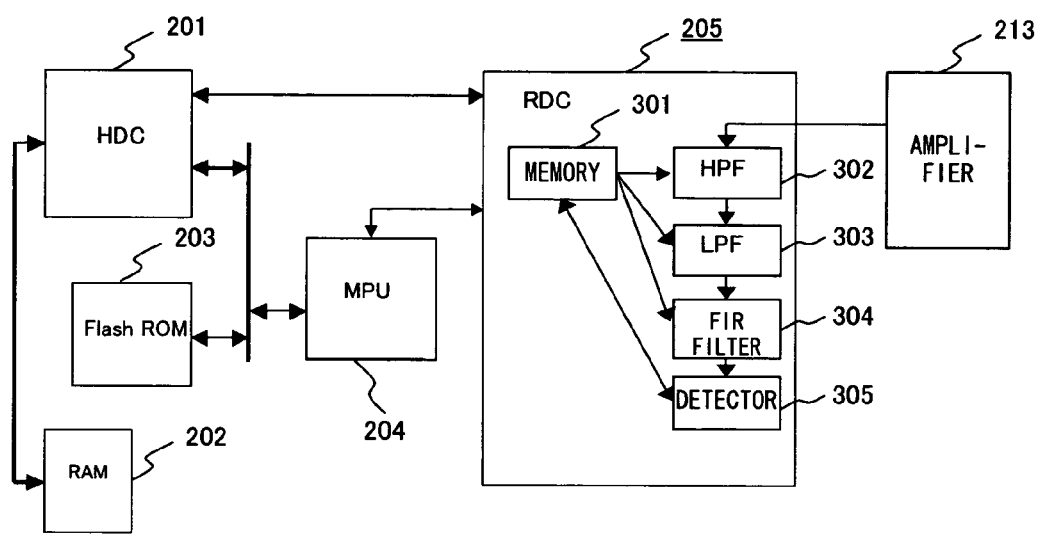
FIG. 3 shows the demodulation process of a reproduction signal by the storage device in the preferred embodiment of the present invention.

FIG. 3 shows the demodulation process of a reproduction signal by the storage device 10 in the preferred embodiment of the present invention.

The RDC 205 shown in FIG. 2 comprises memory 301 for storing the demodulated data and setting information for an HPF 302, an LPF 303 and the like, an HPF 302, an LPF 303 and an FIR filter 304, for demodulating the reproduction signal supplied from the amplifier 213 and a detector 305 for detecting a digital signal from the demodulated signal.

By modifying the respective settings of the HPF 302, LPF 303, FIR filter 304 and detector 305, a data demodulation method and a reproduction signal waveform equalization method (for example, partial response (PR) method) can be modified. They are set, for example, by setting (writing) a parameter in a register provided inside each component.

For example, when the magnetic disk 200 starts a read process, the RDC 205 requests the current location information of the magnetic head 211 of the MPU 204. The MPU 204 notifies the RDC 205 of the location information of the magnetic head 211 requested from the RDC 205.

The RDC 205 refers to the memory 301 and obtains a filter setting from a table indicating the relationship between the synch mark pattern in an area where the magnetic head 211 is located and the filter setting (hereinafter called "setting table"). Then, the RDC 205 modifies the respective settings of the HPF 302, LPF 303, FIR filter 304 and detector 305 according to the filter setting.

The reproduction signal read from the magnetic disk 209 via the magnetic head 211 is amplified by the amplifier 213 and is supplied to the RDC 205. The supplied reproduction signal is equalized by the filters 302 through 304 inside the RDC 205 and its data is detected by the detector 305.

In this case, the detector 205 detects a synch mark pattern in order to synchronize its data starting position. The RDC 205 refers to the setting table stored in the memory 201 and obtains the setting of the filter/signal processing method corresponding to the synch mark pattern detected by the detector 205. Then, the setting value of the filter/signal processing method is set in the HPF 302, LPF 303, FIR filter 304 and detector 305 inside the RDC 205 and data following the synch mark pattern is detected.

The detected data information is supplied to the HDC 201 and is transmitted to the higher-order system.

(1) The First Preferred Embodiment

The first preferred embodiment of the present invention is described below with reference to FIGS. 4 through 8.

Figure 4:
FIG. 4 shows an example of the synch mark allocation table of the first preferred embodiment;.

FIG. 4 shows an example of a synch mark allocation table 40 of the first preferred embodiment. The synch mark allocation table 40 is comprised of a zone number attached to each area obtained by multiply dividing a magnetic disk in the rotation direction (hereinafter called "zone"), a cylinder number of a cylinder in each zone, a sector number of a sector at each cylinder number and a synch mark pattern used in each sector.

An initially defined synch mark pattern is a default synch mark pattern. For Example, "1000100011110000" in the synch mark pattern allocation table 40 shown in FIG. 4 is the default synch mark pattern.

FIG. 5 shows an example of the filter setting table 50 of the first preferred embodiment.

The filter setting table 50 shown in FIG. 5 is comprised of the synch mark pattern shown in FIG. 4, the cut-off frequency of the HPF 302, set when the synch mark pattern is detected, the high-band cut-off frequency and boost value of the LPF 303, and tap co-efficients 1 through 5 of the FIR filter 304.

The respective characteristics obtained by setting parameters, which are shown in FIG. 5, are used without any modifications as the cut-off frequency of the HPF 302, and the high band cut-off frequency and boost value of the LPF 303, for convenience' sake. For example, the synch mark pattern "1000100011110000" indicates that the storage device 10 obtains a cut-off frequency 1.0 MHz by setting a predetermined value in the parameter of the HPF 302.

Figure 6:
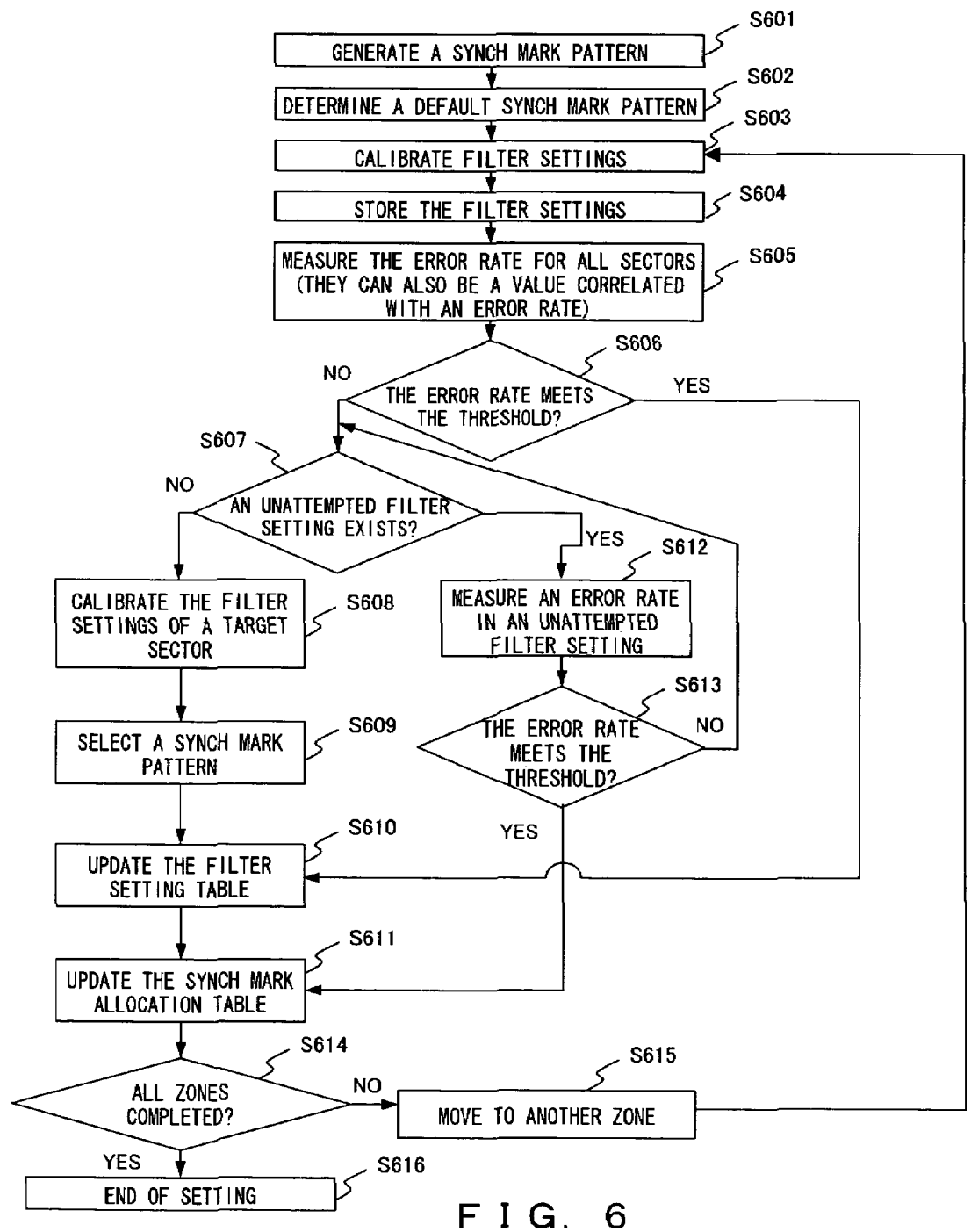
FIG. 6 is a flowchart showing the filter setting process of the storage device in the first preferred embodiment.

FIG. 6 is a flowchart showing the filter setting process of the storage device 10 in the first preferred embodiment. The process shown in FIG. 6 is performed only once before storing data in the storage device 10 (for example, before shipment).

In step S601, the storage device 10 generates a plurality of synch mark patterns to be written into a sector. Then, in step S602, one is selected from the plurality of synch mark patterns generated in step S601 and is specified as its default synch mark pattern.

In step S603, the storage device 10 calibrates the filters (HPF 302, LPF 303, FIR filter 304) in a sector of a predetermined area. For example, its error rate is detected by writing/reading data into/from a sector in a predetermined area, and adjusts the filter setting values (the cut-off frequency of an HPF, the high-band cut-off frequency and boost value of an LPF and the tap co-efficients of an FIR filter) in such a way that the error rate may become equal to or less than a predetermined value.

In step S604, the storage device 10 stores the filter setting values obtained by the calibration in step S603 in the filter setting table 50 as the filter settings of the default synch mark pattern (hereinafter called "default filter settings").

In step S605, the storage device 10 sets the default filter settings in the filters (HPF 302, LPF 303, FIR filter 304) and measures error rate by applying write and read processes to all the sectors.

When detecting a sector whose error rate is larger than a threshold in step S606, the storage device 10 determines that the error rate does not meet the threshold yet and its process proceeds to step S607. Then, the storage device 10 search for a filter setting in which processes in steps S610 through S613 are not attempted, out of the filter settings registered in the filter setting table 50 (hereinafter called "unattempted filter setting").

If there is no corresponding filter setting, the process proceeds to step S608 and calibrates the filter setting values of a sector detected in step S606 (hereinafter in this flowchart called "target sector").

In step S609, the storage device 10 selects one not registered in the synch mark allocation table 40 from the synch mark patterns generated in step S601.

Then, in step S610, the storage device 10 correlates the filter setting obtained by the calibration in step S608 with the synch mark pattern selected in step S609 and stores them in the filter setting table 50. Then, in step S611, the storage device 10 stores the target sector (zone, cylinder number and sector number) and the synch mark pattern selected in step S609 in the synch mark allocation table 40.

If in step S607 there is an unattempted filter setting, the process of the storage device 10 proceeds to step S612 and the storage device 10 selects one from the unattempted filter settings. Then, the storage device 10 sets the relevant filter setting in the filters (HPF 302, LPF 303, FIR filter 304) and measures error rate by applying writing and read processes to all the sectors.

After measuring the error rate, the process of the storage device 10 proceeds to step S613. Then, the storage device 10 determines whether the error rate meets the threshold. If the error rate is larger than the threshold, the storage device 10 determines that the error rate does not meet the threshold and its process proceeds to step S607. If the error rate is equal to or less than the threshold, the storage device 10 determines that the error rate meets the threshold and its process proceeds to step S611 to store the target sector (zone, cylinder number and sector number) and the synch mark pattern corresponding to the filter setting selected in step S612 in the synch mark allocation table 40.

The above-described processes in steps S607 through S613 are applied to all the sectors detected in step S606 (sectors whose error rates are larger than the threshold), which are not shown in FIG. 6.

If in step S606 the error rates of all the sectors are equal to or less than the threshold, the storage device 10 determines that the error rate meets the threshold and its process proceeds to step S611. Then, the storage device 10 stores the default synch mark pattern in the synch mark allocation table 40.

In step S614, the storage device 10 checks whether the processes in steps S603 through S613 for all the zones are completed. If there is a zone in which the processes in steps S603 through S613 are not performed, the process proceeds to step S615 to move a process target to another zone in which the processes in steps S603 through S613 are not performed. Then, the process proceeds to step S603.

If in step S614 the processes in steps S603 through S613 of all the zones are completed, the process proceeds to step S616 to terminate the setting process.

Figure 7:
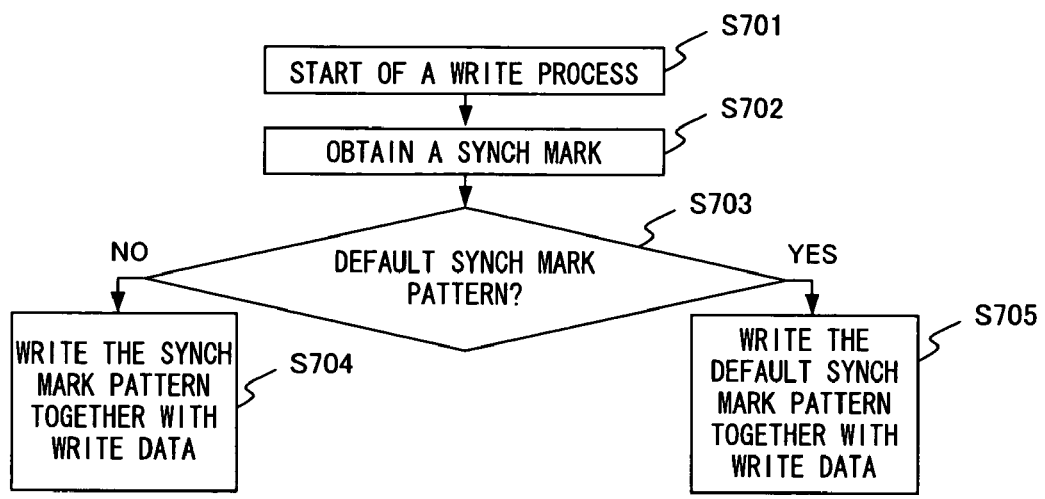
FIG. 7 is a flowchart showing the write process of the storage device in the first preferred embodiment.

FIG. 7 is a flowchart showing the write process of the storage device 10 in the first preferred embodiment.

When receiving data from the higher-order system in step S701, the storage device 10 divides the data into a predetermined size (for example, blocks) and start a write process for each sector. Hereinafter, a sector for data to be written in this flowchart is called "target sector" and the data to be written into the target sector is called "write data".

In step S702, the storage device 10 refers to the synch mark allocation table 40 to obtain a synch mark pattern corresponding to the target sector and its process proceeds to step S703.

In step S703, the storage device 10 determines whether the synch mark pattern obtained in step S702 is the default synch mark pattern. If the synch marl pattern obtained in step S702 is not the default synch mark pattern, its process proceeds to step S704.

In step S704, the storage device 10 writes the synch mark pattern obtained in step S702 together with the write data in the target sector.

If in step S703 the synch marl pattern obtained in step S702 is the default synch mark pattern, its process proceeds to step S705. Then, the storage device 10 writes only the write data into the target sector.

The above-described processes in steps S702 through S705 are performed until all pieces of the write data divided in step S701 are written into the target sector and the process is terminated.

Figure 8:
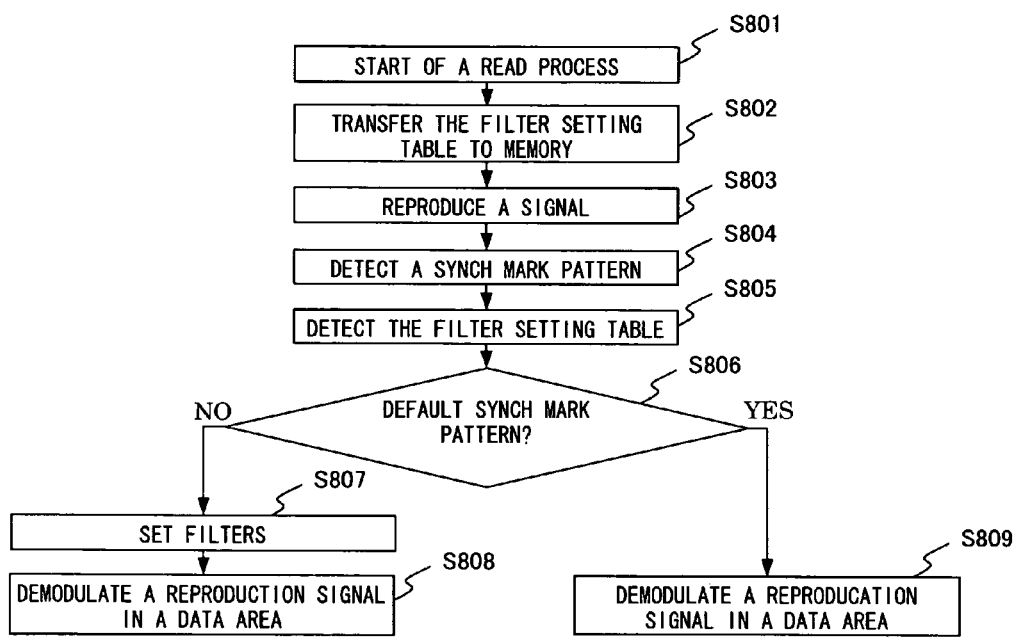
FIG. 8 is a flowchart showing the read process of the storage device in the first preferred embodiment.

FIG. 8 is a flowchart showing the read process of the storage device 10 in the first preferred embodiment.

When receiving a data request from the higher-order system 214 in step S801, the storage device 10 starts a process of reading data from each sector storing the requested data. Hereinafter, a sector storing the requested data in this flowchart is called "target sector", and data to be read from the target sector is called "read data".

In step S802, the storage device 10 transfers the filter setting table 50 stored in, for example, the flash ROM 203 to the RDC 205 and then to the memory 301 in the RDC205. Then, the storage device 10 refers to the filter setting table 50 developed in the memory 301 to obtain a filter setting corresponding to the default synch mark pattern and sets the respective parameters of the HPF 302, LPF 303, FIR filter 304 and detector 305.

In step S803, the storage device 10 reproduces the signal of the data stored in the target sector of the media 209. Then, in step S804, the storage device 10 detects a synch mark pattern from the reproduction signal generated in step S803.

For example, the reproduction signal transmitted from the amplifier 213 to the RDC 205 is digitalized via the HPF 302, LPF 303, FIR filter 304 and detector 305. Then, they are temporarily stored in the memory 301. The MPU 204 refers to the data temporarily stored in the memory 301 and searches for data which coincides with the synch mark pattern to detect the synch mark pattern.

In step S805, the storage device 10 refers to the filter setting table 50 and searches for the synch mark pattern detected in step S804. Then, if in step S806, the synch mark pattern detected in step S804 is not the default synch mark pattern, its process proceeds to step S807.

In step S807, the storage device 10 obtains a filter setting corresponding to the synch mark pattern detected in step S804 from the filter setting table 50. Then, the storage device 10 sets the respective parameters and the like, of the HPF 302, LPF 303 and FIR filter 304.

In step S808, the storage device 10 demodulates the reproduction signal in the data area following the synch mark pattern via the HPF 302, LPF 303, FIR filter 304 and detector 305. Then, the demodulated data is transferred to the higher-order system 214 via the HDC 201.

If in step S806 the synch mark pattern detected in step S804 is the default synch mark pattern, the process proceeds to step S809. Then, as in step S808, the storage device 10 demodulates the reproduction signal in the data area following the synch mark pattern via the HPF 302, LPF 303, FIR filter 304 and detector 305. Then, the demodulated data is transferred to the higher-order system 214 via the HDC 201.

As described above, the storage device 10 of this preferred embodiment correlates a filter setting with each of a plurality of different synch mark patterns in advance and detects data by modifying the filter setting according to this synch mark pattern.

Usually (for example, for a sector in an area whose magnetic film on the surface of a magnetic storage medium is uniform), the default setting and the default synch mark pattern related to this filter setting are used. If the error rate degrades (for example, for a sector in an area whose error rate does not meet the threshold since its magnetic film on the surface of a magnetic storage medium is not uniform), the filter setting by which an error rate meeting the threshold can be obtained by the calibration and a synch mark pattern related to this filter setting are used. Therefore, the degradation of an error rate at the time of information reading, caused by the change of a magnetic characteristic due to a non-uniform magnetic storage medium can be prevented.

Since the RDC 205 detects a synch mark pattern, the data demodulation method can be modified without using an external controller or the like when modifying the demodulation method of data following a synch mark pattern.

Although in the above-described storage device 10, the filter settings (of the HPF 302, LPF 303 and FIR filter 304) are modified according to the detected synch mark pattern, the waveform equalization method of a reproduction signal can also be modified according to the detected synch mark pattern. If a iterative decoding method is used at the time of the demodulation of a reproduction signal, the times of repetition at the time of demodulation can also be modified according to the detected synch mark pattern.

Specifically, the processes shown in FIGS. 6 through 8 can be performed using the PR method setting table 90 shown in FIG. 9 or the repetition times setting table 100 shown in FIG. 10, instead of the filter setting table 50 shown in FIG. 5.

A case where the PR method setting table 90 is used instead of the filter setting table 50 and a case where the repetition times setting table 100 instead of the filter setting table 50 are described below as the second and third preferred embodiments, respectively.

(2) The Second Preferred Embodiment

The second preferred embodiment of the present invention is described below with reference to FIGS. 6 through 9.

FIG. 9 shows an example of the PR method setting table 90 of this preferred embodiment.

The PR method setting table 90 shown in FIG. 9 is comprised of the synch mark pattern shown in FIG. 4, a PR method for setting the filters when detecting the synch mark pattern, the cut-off frequency of the HPF 302, the high-band cut-off frequency and boost value of the LPF 303 and the tap co-efficients 1 through 5 of the FIR filter 304.

As in FIG. 5, the respective characteristics obtained by setting parameters in the filters 302 through 304 and the detector 305 are used without any modifications as the PR method, the cutoff frequency of the HPF 302 and the high-band cut-off frequency and boost value of the LPF 303, which are shown in FIG. 9, for convenience' sake.

In this preferred embodiment, the waveform of a reproduction signal is equalized by the PR method. The PR method uses a PR4 (1, 0, −1) method with a band-pass type characteristic, an extended RP4 (EPR4) (1, 1, −1, −1) method restricting a band frequency and an extended EPR4 (EEPR4) (1, 2, 0, −2, −1) method, depending on how to give symbol interference. Since the PR methods, such as PR4, EPR4 and EEPR4, are general arts, their detailed descriptions are omitted here.

The PR method setting process of the storage device 10 in the second preferred embodiment is described below with reference to FIG. 6. Since the processes in steps S601 through S606 and S614 through S616 are the same as those of the storage device 10 in the first preferred embodiment, their descriptions are omitted here.

In step S607 of FIG. 6, the storage device 10 searches for a PR method in which the processes in steps S610 through S613 are not attempted yet (hereinafter called "unattempted PR method"), of the PR method registered in the PR method setting table 90.

If there is no corresponding PR method, the process proceeds to step S608 to calibrate the PR method and filter setting values of a sector detected in step S606 (hereinafter in this flowchart called "target sector").

In this case, if the iterative decoding method is used for demodulation, the error rate can be changed according to the times of repetition at the time of demodulation. The more the times of repetition is, the more the error rate can be improved. However, since the self-operation time also becomes long for the repeated operations, the minimum times of repetition must be set to the extent that the error rate may meet the threshold.

In step S609, the storage device 10 selects one of the synch mark patterns not registered in the synch mark allocation table 40, out of the synch mark patterns generated in step S601.

Then, in step S610, the storage device 10 correlates the PR method and filter settings which are obtained by the calibration in step S608 with the synch mark pattern selected in step S609 and stores them in the PR method setting table 90. Then, in step S611, the storage device 10 stores the target sector (zone, cylinder number and sector number) and the synch mark pattern selected in step S609 in the synch mark allocation table 40.

If in step S607 there is an unattempted PR method, the process of the storage device 10 proceeds to step S612 to select one of the unattempted PR methods. Then, the storage device 10 sets the PR method and filter settings in the filters (HPF 302, LPF 303 and FIR filter 304) and detector 305, and measures the error rate by applying write and read processes to the target sector.

After measuring the error rate, the process of the storage device 10 proceeds to step S613 to determine whether the error rate meets the threshold. If the error rate is larger than the threshold, the storage device 10 determines that the error rate does not meet the threshold and its process proceeds to step S607. If the error rate is equal to or less than the threshold, the storage device 10 determines that the error rate meets the threshold and its process proceeds to step S611. Then, in step S611, the storage device 10 stores the target sector (zone, cylinder number and sector number), and a synch mark pattern corresponding to the PR method and filter settings selected in step S612 in the synch mark allocation table 40.

The read process of the storage device 10 in the second preferred embodiment is described below with reference to FIG. 8.

In step S801 of FIG. 8, when receiving a data request from the higher-order system 214, the storage device 10 starts the process of reading data from each sector storing the requested data. Hereinafter in this flowchart, a sector storing the requested data is called "target sector" and data read from the target sector is called "read data".

In step S802, the storage device 10 transfers the PR method setting table 90 stored in, for example, the flash ROM 203 to the RDC 205 and then to the memory 301 in the RDC 205. Then, the storage device 10 refers to the PR method setting table 90 developed in the memory 301 to obtain a PR method and filter settings corresponding to the default synch mark pattern and sets respective parameters in the HPF 302, LPF 303, FIR filter 304 and detector 305.

In step S803, the storage device 10 reproduces the signal of data stored in the target sector of the media 209. Then, in step S804, the storage device 10 detects a synch mark pattern from the reproduction signal generated in step S803.

In step S805, the storage device 10 refers to the PR method setting table 90 and searches for the synch mark pattern detected in step S804. Then, if in step S806 the synch mark pattern detected in step S804 is not the default synch mark pattern, its process proceeds to step S807.

In step S807, the storage device 10 obtains a PR method and filter settings, corresponding to the synch mark pattern detected in step S804 from the PR method setting table 90. Then, the storage device 10 sets the respective parameters of the HPF 302, LPF 303, FIR filter 304 and detector 305.

In step S808, the storage device 10 demodulates the reproduction signal of a data area following the synch mark pattern via the HPF 302, LPF 303, FIR filter 304 and detector 305. Then, the demodulated data is transferred to the higher-order system 214 via the HDC 201.

If in step S806 the synch mark pattern detected in step S804 is the default synch mark pattern, the process proceeds to step S809. As in step S808, the reproduction signal of a data area following the synch mark pattern is demodulated via the filters 302 through 304 and detector 305, and the demodulated data is transferred to the higher-order system 214 via the HDC 201.

(3) The Third Preferred Embodiment

The third preferred embodiment of the present invention is described below with reference to FIGS. 6 through 8 and 10.

In this preferred embodiment, a iterative decoding method is used when demodulating a reproduction signal. Thus, the following repetition times setting table 100 is used instead of the filter setting table 50 used in the first preferred embodiment.

FIG. 10 shows an example of the repetition times setting table 100 of the third preferred embodiment.

The repetition times setting table 100 shown in FIG. 10 is comprised of the synch mark pattern shown in FIG. 4, the times of repetition at the time of demodulation, which is set when detecting the synch mark pattern, the cut-off frequency of the HPF 302, the high-band cut-off frequency and boost value of the LPF 303 and the tap co-efficients 1 through 5 of the FIR filter 304.

As in FIG. 5, the respective characteristics obtained by setting parameters in the filters 302 through 305 and the detector 305, which are shown in FIG. 9, are used without any modifications as the cut-off frequency of the HPF 302 and the high-band cut-off frequency and boost value of the LPF 303, for convenience' sake.

The repetition times setting process of the storage device 10 in the third preferred embodiment is described below with reference to FIG. 6. Since processes in steps S601 through S606 and S614 through S616 are the same as those of the storage device 10 in the first preferred embodiment, their descriptions are omitted here.

In step S607 of FIG. 6, the storage device 10 searches for the times of repetition with which process in steps S610 through S613 are not attempted yet (hereinafter called "unattempted times of repetition"), of the times of repetition registered in the repetition times setting table 100.

If there are no corresponding times of repetition, the process proceeds to step S608 and the times of repetition and filter setting values of a sector detected in step S606 (hereinafter in this flowchart, called "target sector") are calibrated.

In step S609, the storage device 10 selects one of the synch mark patters not registered in the synch mark allocation table 40, out of the synch mark patterns generated in step S601.

Then, in step S610, the storage device 10 correlates the times of repetition and filter settings which are obtained by the calibration in step S608 with the synch mark pattern selected in step S609 and stores them in the repetition times setting table 100. Then in step S611, the storage device 10 stores the target section (zone, cylinder number and sector number) and the synch mark pattern selected in step S609 in the synch mark allocation table 40.

If in step S607 there is an unattempted times of repetition, the process of the storage device 10 proceeds to step S612 and the storage device 10 selects one of the unattempted times of repetition. Then, the storage device 10 sets the times of repetition and filter settings in the filters (HPF 302, LPF 303 and FIR filter 304) and the detector 305, and measures its error rate by applying write and read processes to the target sector.

After measuring the error rate, the process of the storage device 10 proceeds to step S613 and determines whether the error rate meets the threshold. If the error rate is larger than the threshold, the storage device 10 determines that the error rate does not meet the threshold and its process proceeds to step S607. If the error rate is equal to or less than the threshold, the storage device 10 determines that the error rate meets the threshold and its process proceeds to step S611. In step S611, the storage device 10 stores the target sector (zone, cylinder number and sector number) and a synch mark pattern corresponding to the times of repetition and filter settings which are selected in step S612 in the synch mark allocation table 40.

The read process of the storage device 10 in the third preferred embodiment is described below with reference to FIG. 8.

In step S801 of FIG. 8, when receiving a data request from the higher-order system 214, the storage device 10 starts the process of reading data from each sector storing the requested data. Hereinafter in this flowchart, a sector storing the requested data is called "target sector" and data read from the target sector is called "read data".

In step S802, the storage device 10 transfers the repetition times setting table 100 stored in, for example, the flash ROM 203 to the RDC 205 and to the memory 301 in the RDC 205. Then, the storage device 10 refers to the repetition times setting table 100 developed in the memory 301 to obtain the times of repetition and filter settings, corresponding to the default synch mark pattern and sets parameters in the HPF 302, LPF 303, FIR filter 304 and detector 305.

In step S803, the storage device 10 reproduces the signal of data stored in the target sector of the media 209. Then, in step S804, the storage device 10 detects a synch mark pattern from the reproduced signal generated in step S803.

In step S805, the storage device 10 refers to the repetition times setting table 100 and searches for the synch mark pattern detected in step S804. Then, if in step S806 the synch mark pattern detected in step S804 is not the default synch mark pattern, its process proceeds to step S807.

In step S807, the storage device 10 obtains times of repetition and filter settings, corresponding to the synch mark pattern detected in step S804 from the repetition times setting table 100, and sets parameters in the HPF 302, LPF 303, FIR filter 304 and detector 305.

In step S808, the storage device 10 demodulates a reproduction signal in a data area following the synch mark pattern via the HPF 302, LPF 303, FIR filter 304 and detector 305. Then, the demodulated data is transferred to the higher-order system 214 via the HDC 201.

If in step S806 the synch mark pattern detected in step S804 is the default synch mark pattern, the process proceeds to step S809. Then, as in step S808, a reproduction signal in a data area following the synch mark pattern is demodulated via the HPF 302, LPF 303, FIR filter 304 and detector 305, and the demodulated data is transferred to the higher-order system 214 via the HDC 201.

Since the write process of the storage device 10 in the second and third preferred embodiments are the same as that shown in FIG. 7, its description is omitted here.

As in the first preferred embodiment, in the above-described second and third preferred embodiments, the storage device 10 correlates a PR method and filter settings, and the times of repetition and filter settings (hereinafter called "filter settings and the like"), respectively, for each of a plurality of different synch mark patterns in advance, and detects data by modifying the filter settings and the like, according to this synch mark pattern.

Then, usually default filter settings and the default synch mark pattern correlated with the default filter settings are used. In this case, if the error rate degrades, filter settings in which an error rate meeting the threshold can be obtained by calibration and a synch mark pattern correlated with the filter settings are used. Thus, the degradation of an error rate at the time of information reading, caused by the change of a magnetic characteristic due to a non-uniform magnetic storage medium can be prevented.

Although in the first preferred embodiment, a signal detection method in the case where the storage device 10 reads information stored in the data area of the magnetic disk 209 is described, similarly the present invention can be also applied to signal detection in the case where servo information (cylinder location information or the like) stored in the servo area of the magnetic disk 209.

In this case, the processes shown in FIGS. 6 through 8 can be performed using the synch mark allocation table 110 shown in FIG. 11 instead of the synch mark allocation table 40 shown in FIG. 4, and the filter setting table 120 shown in FIG. 12 instead of the filter setting table 50 shown in FIG. 5. If in the servo area, servo signals are written with the same frequency from the inner to outer on the magnetic disk 209, the characteristic of a reproduction signal changes since the storage density of a servo signal varies depending on its diameter position.

Therefore, for example, in steps S603 and S608, calibration is performed in such a way that the error rate of Gray Code may meet the threshold, and in step S605, the error rate of Gray Code is to be measured.

FIG. 11 shows an example of the synch mark allocation table 110 in the servo area of the first preferred embodiment. The synch mark allocation table 110 shown in FIG. 11 is comprised of the cylinder number of each cylinder, the sector number of a sector in each cylinder number and a synch mark pattern used in each sector. As in FIG. 4, an initially defined synch mark pattern is a default synch mark pattern.

FIG. 12 shows an example of the filter setting table 120 in the servo area of the first preferred embodiment.

The filter setting table 120 shown in FIG. 12 is comprised of the synch mark pattern shown in FIG. 11, the cut-off frequency of the HPF 302, set when detecting the synch mark pattern, the high-band cut-off frequency and boost value of the LPF 303 and the tap co-efficients 1 through 5 of the FIR filter 304. As in FIG. 5, respective characteristics obtained by setting parameters are used without any modifications as the cut-off frequency of the HPF 302 and the high-band cut-off frequency and boost value of the LPF 303.

What is claimed is:

1. A storage device for digitizing a signal reproduced by a storage medium and reading data, comprising:
    a reproduction signal generation unit for generating a reproduction signal from information stored in the storage medium;
    a synch mark pattern detection unit for detecting a synch mark pattern indicating a starting point of data in the reproduction signal;
    a filter setting unit for modifying a setting of a filter which is used to digitize the reproduction signal and whose characteristic is modified, according to the synch mark pattern obtained from filter setting information, the filter setting information defines the filter setting with respect to each synch mark pattern to keep an error rate associated with reading the data below a predetermined rate; and
    a data detection unit for detecting data which is digitized by passing the reproduction signal through the filter and which follows the synch mark pattern.

2. The storage device according to claim 1, further comprising:
    a synch mark pattern generation unit for generating a plurality of different synch mark patterns;
    an error rate measuring unit for reading predetermined data after writing the data in the storage medium and specifying an error rate; and
    a filter setting allocation unit for allocating the filter setting to the synch mark pattern in such a way that the error rate becomes equal to or less than a predetermined value.

3. The storage device according to claim 1, further comprising:
    a detection method setting unit for modifying a partial response method for equalizing a waveform of the reproduction signal according to the synch mark pattern when digitizing the reproduction signal.

4. The storage device according to claim 1, further comprising:
    a detection method setting unit for modifying times of repetition of an iterative decoding method used when digitizing the reproduction signal according to the synch mark pattern.

5. The storage device according to claim 1, wherein
    the synch mark pattern indicates a starting point of data in a servo area of the storage medium.

6. A reproduction signal detection method for digitizing a signal reproduced by a storage medium and reading data, comprising:
    generating a reproduction signal from information stored in the storage medium;
    detecting a synch mark pattern indicating a starting point of data in the reproduction signal;
    modifying a setting of a filter which is used to digitize the reproduction signal and whose characteristic is modified, according to the synch mark pattern obtained from filter setting information, the filter setting information defines the filter setting with respect to each synch mark pattern to keen an error rate associated with reading the data below a predetermined rate; and a data detection process of detecting data which is digitized by passing the reproduction signal through the filter and which follows the synch mark pattern.

7. The reproduction signal detection method according to claim 6, further comprising:

generating a plurality of different synch mark patterns;

reading predetermined data after writing the data in the storage medium and specifying an error rate; and allocating the filter setting to the synch mark pattern in such a way that the error rate becomes equal to or less than a predetermined value.

8. The reproduction signal detection method according to claim 6, further comprising:

modifying a partial response method for equalizing a waveform of the reproduction signal according to the synch mark pattern when digitizing the reproduction signal.

9. The reproduction signal detection method according to claim 6, further comprising:

modifying times of repetition of a iterative decoding method used when digitizing the reproduction signal according to the synch mark pattern.

10. The reproduction signal detection method according to claim 6, wherein the synch mark pattern indicates a starting point of data in a servo area of the storage medium.

11. A signal generation circuit, comprising:

a synch mark pattern detection unit for detecting a synch mark pattern indicating a starting point of data in a reproduction signal;

a filter setting unit for modifying a setting of a filter which is used to digitize the reproduction signal and whose characteristic is modified, according to the synch mark pattern obtained from filter setting information, the filter setting information defines the filter setting with respect to each synch mark pattern to keen an error rate associated with reading the data below a predetermined rate; and a data detection unit for detecting data which is digitized by passing the reproduction signal through the filter and which follows the synch mark pattern.

12. The signal generation circuit according to claim 11, further comprising:

a synch mark pattern generation unit for generating a plurality of different synch mark patterns;

an error rate measuring unit for reading predetermined data after writing the data in the storage medium and specifying an error rate; and a filter setting allocation unit for allocating the filter setting to the synch mark pattern in such a way that the error rate becomes equal to or less than a predetermined value.

13. The signal generation circuit according to claim 12, further comprising:

a detection method setting unit for modifying a partial response method for equalizing a waveform of the reproduction signal according to the synch mark pattern when digitizing the reproduction signal.

14. The signal generation circuit according to claim 13, further comprising:

a detection method setting unit for modifying times of repetition of an iterative decoding method used when digitalizing the reproduction signal according to the synch mark pattern.

15. The signal generation circuit according to claim 14, wherein the synch mark pattern indicates a starting point of data in a servo area of the storage medium.

\* \* \* \* \*